US012771785B1

(12) United States Patent
Byrd et al.

(10) Patent No.: US 12,771,785 B1
(45) **Date of Patent: *Oct. 20, 2026**

(54) IN-PERSON AUDIO ACCESS FOR REMOTE USERS

(71) Applicant: United Services Automobile Association (USAA), San Antonio, TX (US)

(72) Inventors: Matthew Robert Byrd, Weatherford, TX (US); David Joaquin Harris, San Antonio, TX (US); Nickolaus Wayne O'Neal, San Antonio, TX (US); Deborah Janette Schulz, San Antonio, TX (US); Nina Cooper, San Antonio, TX (US); Donette Rae Williams, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 18/945,157

(22) Filed: Nov. 12, 2024

Related U.S. Application Data

(63) Continuation of application No. 17/750,583, filed on May 23, 2022, now Pat. No. 12,184,811.

(51) Int. Cl.

| | |
|---|---|
| ***H04M 3/42*** | (2006.01) |
| ***G10L 15/22*** | (2006.01) |
| ***G10L 15/26*** | (2006.01) |
| ***H04R 3/00*** | (2006.01) |

(52) U.S. Cl.
CPC ......... *H04M 3/42221* (2013.01); *G10L 15/22* (2013.01); *G10L 15/26* (2013.01); *H04R 3/005* (2013.01)

(58) Field of Classification Search
CPC ......... G10L 15/26; G10L 17/00; G10L 15/22; G10L 15/63; H04M 3/42221; H04M 3/568; H04R 3/005
USPC ...................................................... 379/202.01
See application file for complete search history.

(56) References Cited

U.S. PATENT DOCUMENTS

| | | | | |
|---|---|---|---|---|
| 11,750,745 | B2 * | 9/2023 | Malan .................. | H04M 3/568 379/202.01 |
| 2014/0104369 | A1 | 4/2014 | Calman et al. | |
| 2014/0235215 | A1 | 8/2014 | Perez | |
| 2020/0320978 | A1 | 10/2020 | Chatterjee et al. | |
| 2020/0401466 | A1 | 12/2020 | Frost et al. | |
| 2022/0038580 | A1 | 2/2022 | Li et al. | |
| 2023/0353406 | A1 | 11/2023 | Hannun et al. | |

* cited by examiner

*Primary Examiner* — Md S Elahee
(74) *Attorney, Agent, or Firm* — Potomac Law Group, PLLC; Dannon G. Allbee

(57) ABSTRACT

Aspects of the present disclosure are directed to providing in-person audio access for remote users. A remote access audio system can detect in-person audio through an array of microphones installed at a site. The remote access audio system can process the in-person audio using speech recognition techniques to determine that an in-person conversation is occurring. The remote access audio system can apply a model to the in-person conversation to determine whether the conversation is relevant to a remote user and transmit an option for the remote user to remotely join or be added to the conversation.

20 Claims, 9 Drawing Sheets

IN-PERSON AUDIO ACCESS FOR REMOTE USERS

CROSS-REFERENCE TO RELATED APPLICATIONS

This application is a continuation of U.S. application Ser. No. 17/750,583, filed May 23, 2022, titled "In-Person Audio Access for Remote Users," currently pending, which is herein incorporated by reference in its entirety.

TECHNICAL FIELD

The present disclosure is directed to providing in-person audio access for remote users.

BACKGROUND

Over the past several years, remote working has become more prevalent. Some workers have opted to work remotely full-time, while others that were previously remote are now returning to the office on a full-time or part-time basis. Working in-office provides a number of advantages, such as the opportunity to dynamically and fluidly collaborate on team projects in-person throughout the day, without requiring a set meeting schedule or specific location within the office.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
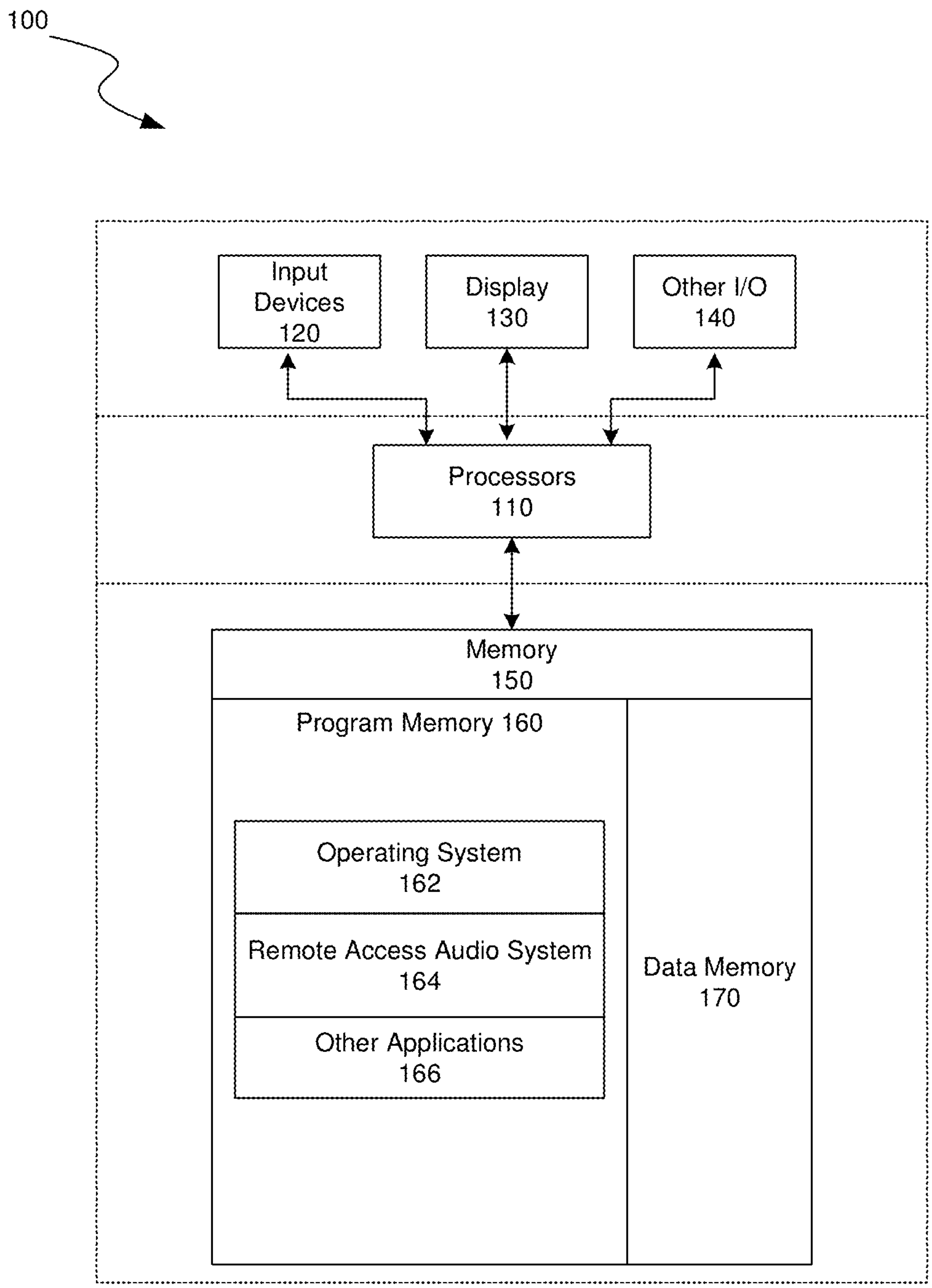
FIG. 1 is a block diagram illustrating an overview of devices on which some implementations can operate.

Aspects of the present disclosure are directed to providing in-person audio access for remote users. A remote access audio system can detect in-person audio through an array of microphones installed at a site. The remote access audio system can process the in-person audio using speech recognition techniques to determine that an in-person conversation is occurring. The remote access audio system can apply a model to the in-person conversation to determine whether the conversation is relevant to a remote user and to transmit an option for the remote user to remotely join or be added to the conversation. The model can be trained based on whether the remote user was previously invited to similar conversations, whether the remote user previously joined similar conversations, and the matching of conversation semantics to the remote user (e.g., projects the user is working on, teams that the user is in, keywords for the user, etc.). If the remote user joins the conversation, the remote access audio system can generate an alert or other indicator at the in-person site such that the in-person users are aware that the remote user has been added to the conversation.

For example, a technology company can have both in-person engineers working at an office and remote engineers working at their homes. Due to the nature of their work, both in-person and remote engineers often work collaboratively on projects via online collaboration software, as well as audio and video teleconferences. However, because they are collocated, engineers working in the office can also have informal and unscheduled in-person conversations in the breakroom, in the hallway, in each other's offices, etc. These conversations can occur proximate to or away from computers, telephones, or other equipment that would typically be used to conference in a remote engineer assigned to the same project. Further, the in-person engineers may simply forget that the conversation might be relevant to the remote engineers, or do not wish to take a break during a brainstorming session to relocate, set up a virtual meeting room, and invite the remote engineers to join the conversation.

In this example, the remote access audio system described herein addresses these problems and others by continuously or intermittently using microphones installed across the office to listen to conversations and determine whether they are relevant to a remote engineer using a trained model. If a conversation is determined to be relevant to the remote engineer, the remote engineer can be prompted to virtually join the conversation and, in some implementations, interact with the in-person engineers via speakers installed at the office. The trained model can be updated based on the content of the conversation and whether the remote engineer joins the conversation once prompted.

Although described in the above example as being applied to an office setting, it is contemplated that the remote access audio system described herein can be used in any physical space, such as a home, a retail store, an outdoor space, etc. For example, the remote access audio system can be used in a family home to monitor for conversations relevant to other family members living away, such as a son at college or a grandparent out of state, and prompt them to join the conversations. In another example, the remote access audio system can be used in an electronics store to monitor conversations for specific questions, such as regarding the processing speed of a laptop. The remote access audio system can apply a model to the conversation to determine that a laptop expert at a remote location can likely answer the question, and prompt the laptop expert to join the conversation.

The remote access audio system described herein can use artificial intelligence and machine learning techniques to identify a conversation that may be relevant to a remote user and prompt the remote user to join an in-person conversation, without requiring that the in-person conversation be held in a designated room or with particular conferencing equipment. The in-person users can continue to naturally and organically discuss a topic without being confined to a particular set meeting schedule or location. Further, the remote user can join the conversation in one-click without the remote user or in-person users having to generate and circulate a meeting invitation to all possible relevant users.

Several implementations are discussed below in more detail in reference to the figures. FIG. 1 is a block diagram illustrating an overview of devices on which some implementations of the disclosed technology can operate. The devices can comprise hardware components of a device 100 that can provide in-person audio access for remote users. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, remote access audio system 164, and other application programs 166. Memory 150 can also include data memory 170, e.g., user data, past conversation data, transcript data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
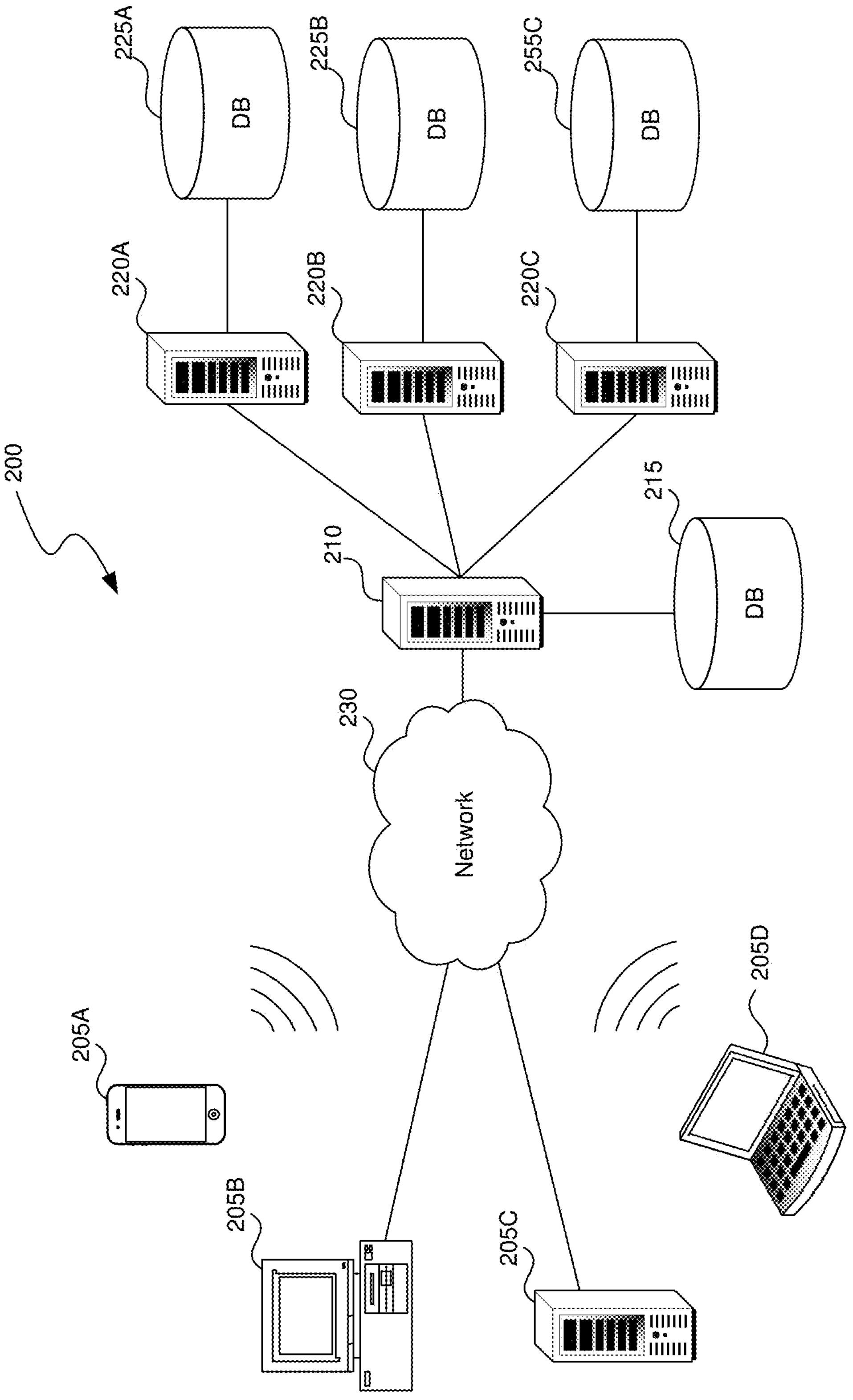
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as user data, past conversation data, transcript data, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
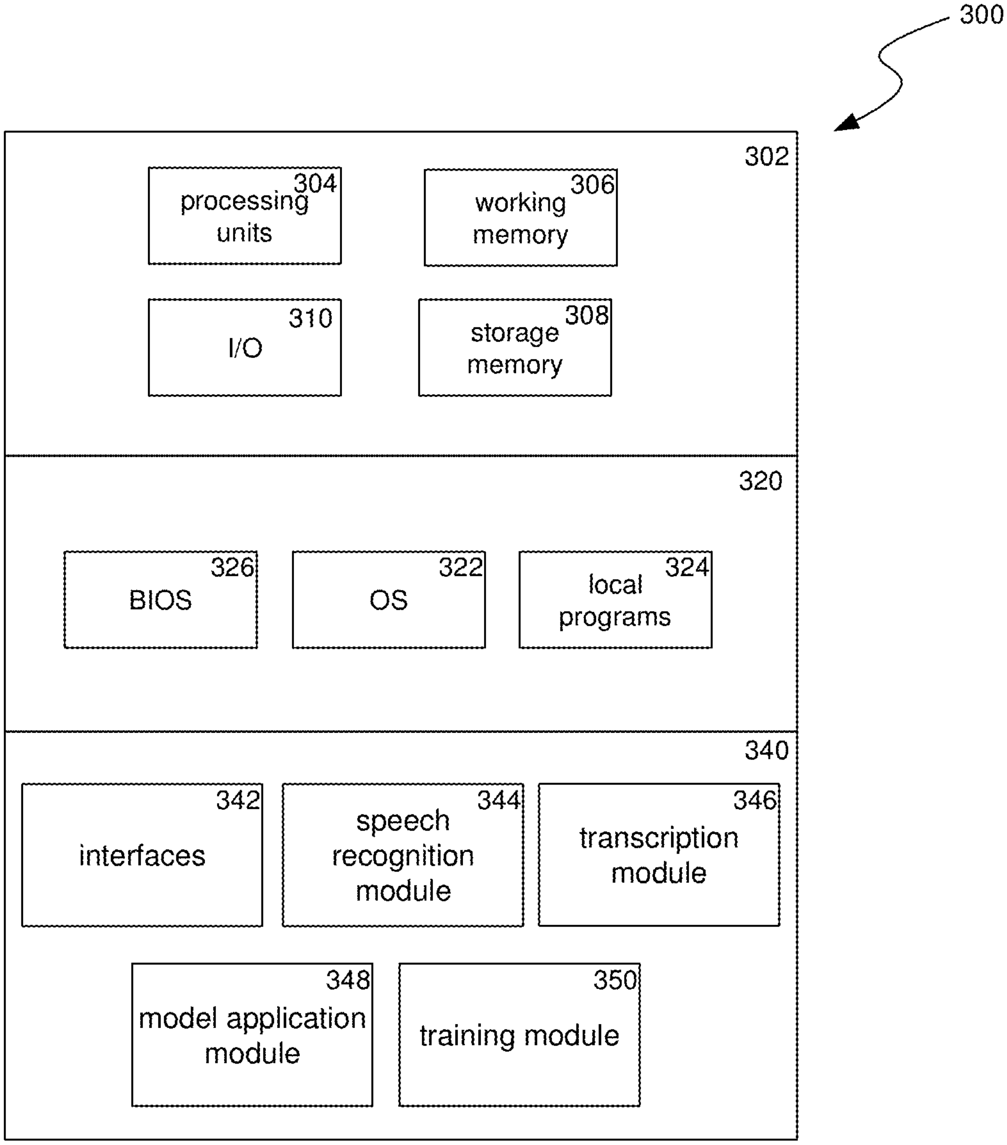
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include speech recognition module 344, transcription module 346, model application module 348, training module 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Interfaces 342 can receive an audio signal corresponding to in-person audio being captured at an in-person site, and provide the audio signal to speech recognition module 344. Speech recognition module 344 can perform speech recognition on the audio signal using any known techniques, such as by applying Hidden Markov models, dynamic time warping, neural networks, end-to-end automatic speech recognition, etc. Once words are identified, transcription module 346 can convert the words to text to generate a transcript of the conversation. Additional details on speech recognition are provided below in relation to block 404 of FIG. 4.

Model application module 348 can receive the transcript from the transcription module 346 and access a model trained to classify relevance of past conversations to a remote user using past transcripts of past conversations. The model can be further trained using metadata associated with the remote user relevant to the past conversations, data indicating whether the user remotely accessed the past conversations, and contextual factors as described further herein with respect to block 406 of FIG. 4.

Model application module 348 can apply the model to the transcript to determine that the conversation is relevant to the remote user. In some implementations, model application module 348 can classify the current conversation's similarity to past conversations by analyzing semantics used in both conversations, as well as the current conversation's relevance to the remote user. Model application module 348 can determine relevance to the remote user based on whether the remote user accessed a similar past conversation and metadata associated with the user. Model application module 348 can further generate a recommendation that a remote user receive the audio signal and facilitate presentation of an option for the remote user to receive the audio signal corresponding to the in-person audio over a network. Additional details on the model are provided below in relation to block 406 of FIG. 4.

Training module 350 can update the model being applied by model application module 348 using the transcript of the conversation and data indicating whether the user received the audio signal. Training module 350 can classify the current conversation as relevant or irrelevant to the remote user based on whether the remote user joins the current conversation, then update the model based on the classification to further learn which future conversations could be relevant to the remote user. Additional details on training the model are provided below in relation to block 714 of FIG. 7.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
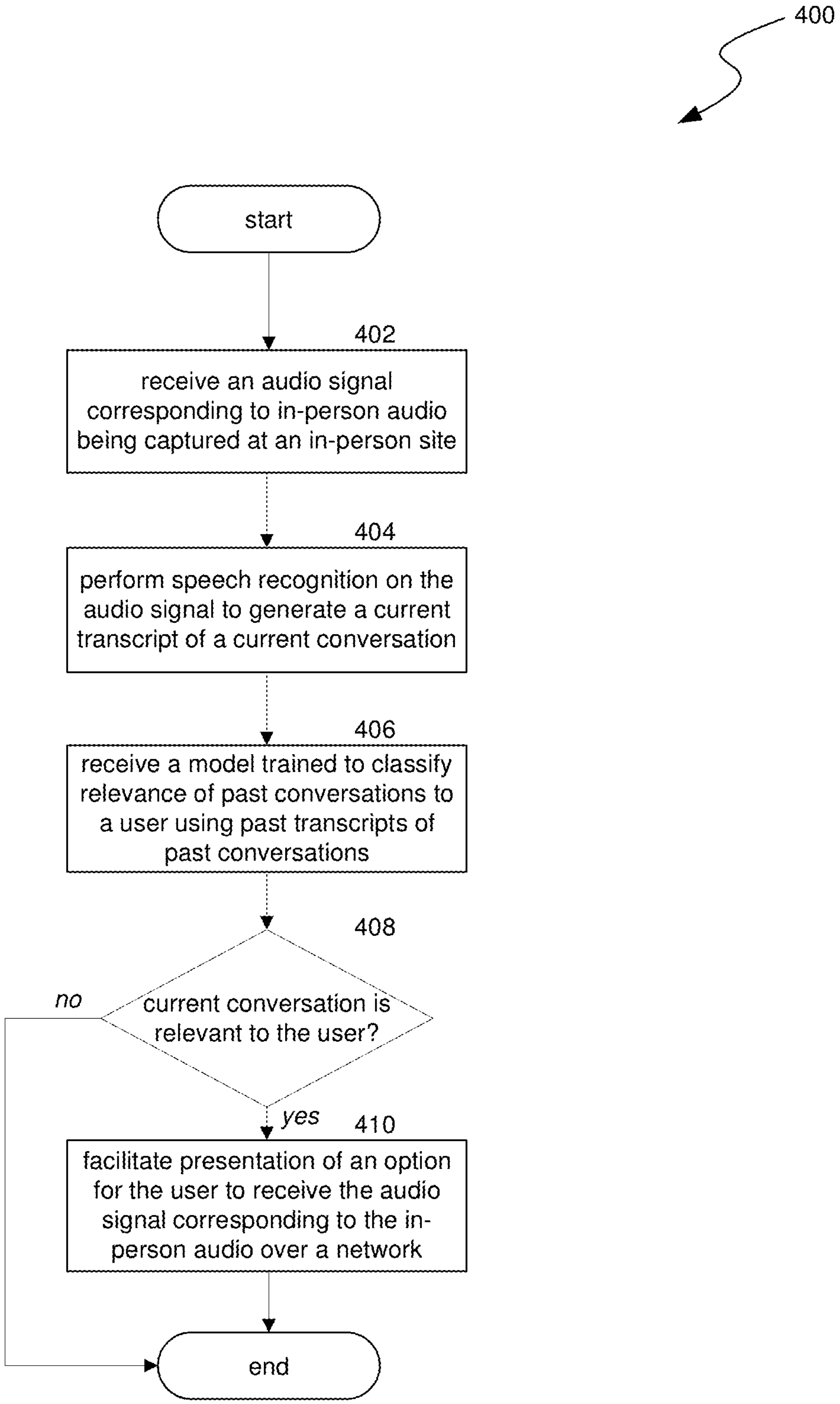
FIG. 4 is a flow diagram illustrating a process used in some implementations for providing a remote user with access to in-person audio.

FIG. 4 is a flow diagram illustrating a process 400 used in some implementations for providing a remote user with access to in-person audio. In some implementations, process 400 can be performed "just in time," e.g., as a response to detection of a current conversation. In some implementations, process 400 can be performed after a conversation is completed, e.g., after a conversation has been recorded in full and a transcript is generated. Process 400 can be performed once or repeated as a conversation continues, or can be repeated for different conversations. Further, multiple instances of process 400 can be run in parallel for different conversations occurring at the same time. Process 400 can be performed on any suitable device, such as device 100 of FIG. 1 described herein, which can be a server in some implementations.

At block 402, process 400 receives an audio signal corresponding to in-person audio being captured at an in-person site. The audio signal can be captured by a microphone installed at the in-person site. In some implementations, the in-person audio can be captured by a plurality of microphones installed at the in-person site (e.g., two or more microphones installed in the same room). In this example, process 400 can select one of the plurality of microphones from which to receive the audio signal for later steps. For example, process 400 can select the audio signal having the greatest average amplitude (i.e., volume), as such an audio signal could result in greater accuracy with respect to speech recognition than lower amplitude audio signals reflecting the same in-person audio. In some implementations, process 400 can switch between audio signals from different microphones to select the audio signal having the greatest amplitude at any particular time, such as when one in-person user is proximate to one microphone, and another in-person user in the same conversation is proximate to another microphone. In some implementations, process 400 can determine the location of the in-person users based on the amplitude of the audio signal received at a plurality of microphones, as described further herein.

At block 404, process 400 performs speech recognition on the audio signal to generate a current transcript of the current conversation occurring at the in-person site. Speech recognition can be performed on the audio signal using any known techniques, such as by applying Hidden Markov models, dynamic time warping, neural networks, end-to-end automatic speech recognition, etc. Once words are identified, process 400 can convert the words into a textual format.

At block 406, process 400 receives a model trained to classify the relevance of conversations to a remote user. Process 400 can train the model using transcripts of past conversations, metadata associated with the remote user relevant to the past conversations, and data indicating whether the user remotely accessed the past conversations. The metadata can include, for example, a project the remote user is working on, a team that the remote user is in, keywords for the remote user, identifying information for the remote user, etc.

In some implementations, process 400 can train the model using contextual factors, such as where a conversation is taking place, the time of the conversation, emotional identifiers for the conversation (e.g., excited, serious, friendly, angry, etc.) tagged by a machine learning process, who the participants in the conversation are, etc. For example, process 400 can identify the in-person users in the conversation then can access metadata associated with those users to identify if they're on the same team and whether there are additional users on the team that are not participating in the conversation (e.g., that work remotely). Process 400 can identify the in-person users using any suitable method, such as voice recognition (e.g., using the microphones), facial recognition (e.g., using cameras), ID badge recognition, access card recognition (e.g., from being swiped into the room where the conversation is occurring), RFID tag recognition, UWB tag recognition, Bluetooth identification of a user device, etc. Process 400 can identify the location of the conversation based on the known location of the microphone (s) used to capture the conversation.

In some implementations, process 400 can train and apply the model to assign a match score between a conversation and the remote user. The match score can be any suitable metric, such as a numeric value, a textual identifier, a percentage, a statistical value, etc. Additional details on assigning match scores are described herein with respect to block 708 of FIG. 7.

At block 408, process 400 applies the model to the current conversation, e.g., using the transcript generated at block 404, to determine whether the current conversation is relevant to the remote user. In some implementations, process 400 can classify the current conversation's similarity to past conversations by analyzing semantics used in both conversations, as well as the current conversation's relevance to the remote user based on whether the remote user accessed a similar past conversation, metadata associated with the user, and contextual factors, as described further herein with respect to block 406. If process 400 determines that the current conversation is relevant to the remote user, process 400 proceeds to block 410. If process 400 determines that the current conversation is not relevant to the remote user, process 400 can end.

At block 410, process 400 facilitates presentation of an option for the remote user to receive the audio signal corresponding to the in-person audio over a network. For example, process 400 can present a prompt to the remote user on the remote user's computing device (e.g., laptop, mobile phone, etc.) to listen to the in-person audio, which, if accepted, can stream the audio signal from the one or more microphones at the in-person site to the remote user's computing device over a network in real- or near real-time. In some implementations, process 400 can identify how to contact the remote user from a user profile associated with the remote user stored in a database. The user profile can include information such as a username or user ID associated with the remote user, an IP address associated with the remote user, applications used by the remote user, etc., such that process 400 can push the prompt to the remote user.

In another example, process 400 can present a prompt to one or more of the in-person users asking whether they would like to add the remote user to listen to the in-person audio. In some implementations, process 400 can audibly prompt the in-person users using a speaker proximate to the microphone and the in-person users, then can continue to apply speech recognition techniques to the answer to determine whether to add the remote user.

After the remote user receives the audio signal, process 400 can generate an alert at the in-person site such that the in-person users are aware that the remote user is listening to the conversation. For example, process 400 can generate a visual alert, such as a turning on or flashing a light proximate to the in-person users, projecting a light on the floor in the vicinity of the in-person users representative of the remote user's presence, turning on an "on air" light, etc. In another example, process 400 can use a digital projector to project a representation of the remote user proximate to the in-person users, such as the remote user's name, avatar, live image, hologram, etc. An example of a visual alert that can be implemented by process 400 is described herein with respect to FIG. 5B.

In another example, when a speaker is installed proximate to the in-person users, process 400 can generate an audible alert, such an announcement that the remote user has joined the conversation. In some implementations, when a speaker is installed proximate to the in-person users, the remote user can verbally interact with the in-person users via a microphone on the remote user's computing device and the speaker installed on-site. It is contemplated that, in some implementations, a video camera can be installed proximate to the in-person users, and can provide both audio and video access to the remote user, and combined speaker and microphone access to the in-person users.

In some implementations, process 400 can present the remote user and/or the in-person users with the option to record the audio signal for later playback by the remote user. Process 400 can further generate an alert at the in-person site when the audio signal is being recorded similar to that described above.

In some implementations, the location of the in-person users within the in-person site can be determined based on audio signals of the same conversation being received from a plurality of microphones installed at the in-person site. For example, process 400 can perform directional analysis on the audio signals by applying sound triangulation techniques to determine the location of the in-person users within a room. Process 400 can triangulate the location of the in-person users based on the known locations of the microphones and the volume of the audio signals received at each microphone. For example, if a first microphone receives an audio signal twice as loud as a second microphone, process 400 can determine that the in-person users are a specified distance between the first microphone and the second microphone. Once known, process 400 can use the location of the in-person users to transmit an alert in the vicinity of the in-person users when the remote user receives the audio signal, and/or to determine from which microphone to receive the audio signal as described above.

In some implementations, process 400 can further update the model using the current transcript of the current conversation and current data indicating whether the user received the audio signal. Process 400 can classify the current conversation as relevant or irrelevant to the remote user based on whether the remote user joins the current conversation, then update the model based on the classification to further learn which future conversations could be relevant to the remote user. Additional details regarding updating the model are described herein with respect to FIGS. 7 and 8.

Figure 5A:
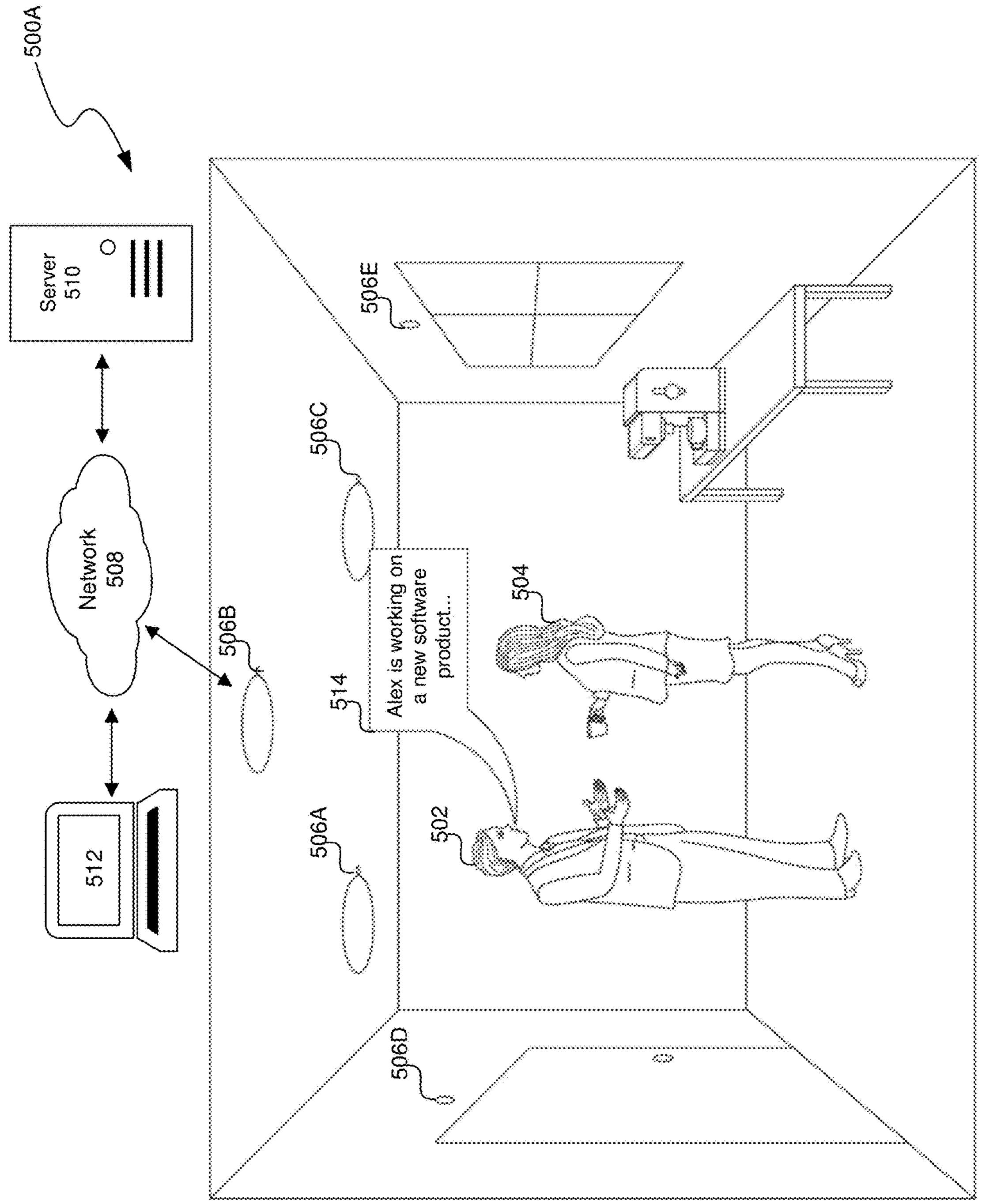
FIG. 5A is a conceptual diagram illustrating an example of an environment in which a remote access audio system can be used.

FIG. 5A is a conceptual diagram illustrating an example of an environment 500A in which a remote access audio system can be used. In this example, environment 500A is an office breakroom setting that includes in-person users 502 and 504. Environment 500A also includes microphones 506A-506E installed throughout the office breakroom setting. Although shown and described as having multiple microphones 506A-506E, it is contemplated that in some implementations, only a single microphone can be installed in the breakroom. Further, it is contemplated that additional microphones can be installed throughout the office outside of the office breakroom setting.

Microphones 506A-506E can detect in-person audio from environment 500A, such as words, phrases, and conversations spoken by users 502 and 504. Microphones 506A-506E can be controllable by server 510. Microphones 506A-506E can generate an audio signal corresponding to the in-person audio. In this example, microphones 506A-506E can detect the words 514 spoken by the in-person user 502.

One or more of the audio signals generated by microphones 506A-506E can be transmitted to server 510, which can be implemented as device 100 of FIG. 1, and perform process 400 of FIG. 4 as described above. Because multiple microphones 506A-506E are present in environment 500A, it is contemplated that one, some, or all of microphones 506A-506E can capture the words 514 spoken by the in-person user 502 and generate audio signals transmitted to server 510. Server 510 can select any suitable audio signal from the plurality of audio signals generated by microphones 506A-506E. For example, server 510 can select the audio signal with the highest amplitude (i.e., volume) from microphone 506B, which is positioned closest to the users 502, 504. In some cases, audio from multiple of the microphones can be blended to for the audio signal used in generating a transcript. In some implementations, when selecting the audio signal from microphone 506B, server 510 can cause microphones 506A, 506C-E to deactivate, conserving power resources.

Server 510 can perform speech recognition on the audio signal to generate a transcript of the words 514 spoken by the user 502. Server 510 can further receive a model trained to classify the relevance of past conversations to a remote user (e.g., previous conversations between users 502, 504, or conversations between other in-person users throughout the environment 500A or other office setting) using transcripts of the past conversations. Server 510 can apply the model to the transcript of the words 514 to determine that the conversation occurring in environment 500A is relevant to the remote user.

Server 510 can further facilitate presentation of an option for the remote user to receive the audio signal at remote user device 512 over network 508, which is located remotely from environment 500A. For example, server 510 can cause remote user device 512 to display a notification asking the remote user if s/he would like to receive the audio signal. Alternatively, server 510 can cause a speaker installed in environment 500A (not shown) to ask in-person users 502, 504 if the audio signal should be pushed to remote user device 512, and can perform speech recognition on the answer to determine whether to do so.

Figure 5B:
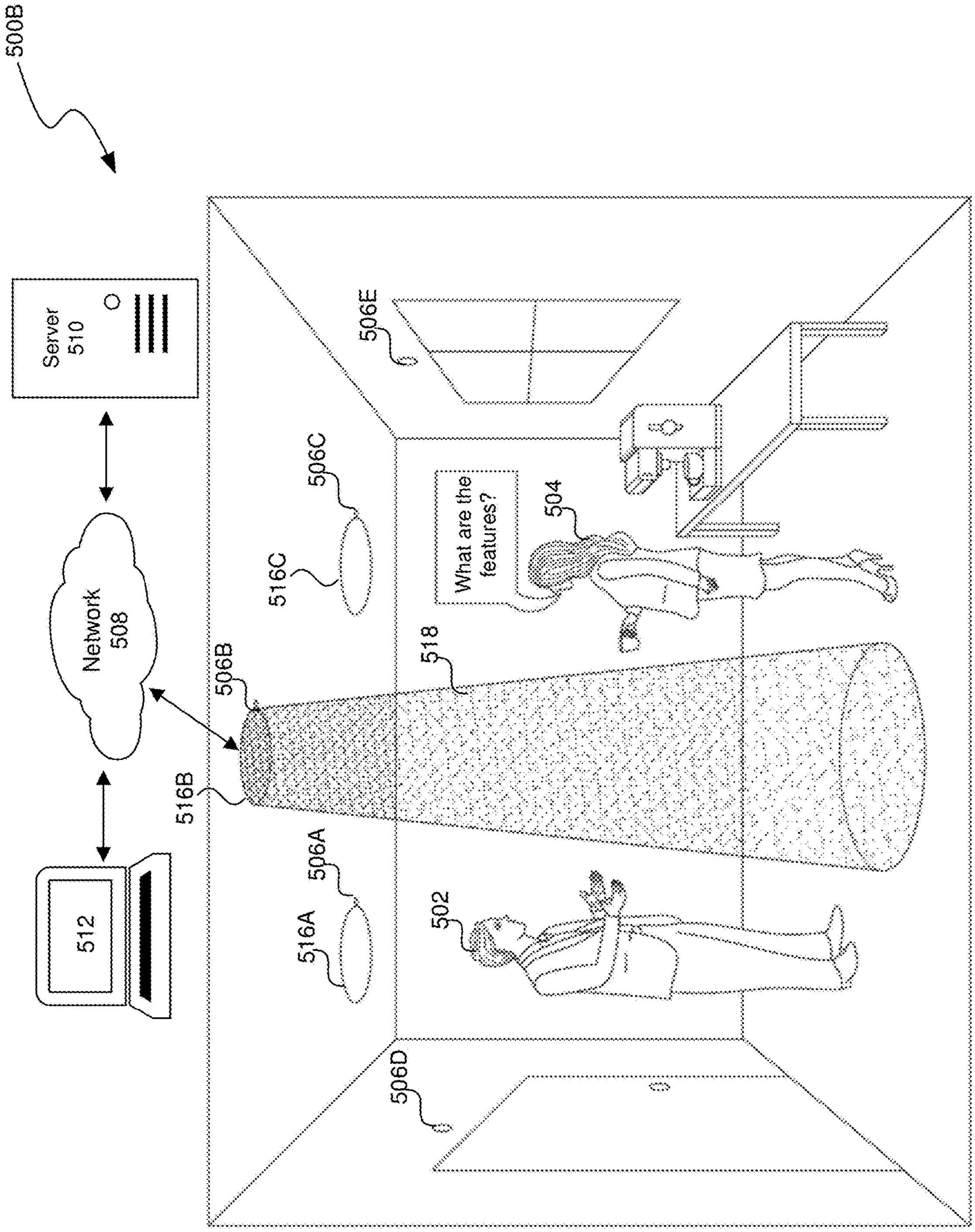
FIG. 5B is a conceptual diagram illustrating an example of an in-person alert that can be generated in a remote access audio system environment when the remote user accesses the in-person audio.

FIG. 5B is a conceptual diagram illustrating an example of an in-person alert that can be generated in an environment 500B when remote user device 512 accesses the in-person audio. Environment 500B can be similar to environment 500A described above with respect to FIG. 5A. In the example shown in FIG. 5B, microphones 506A-506C are coupled with or proximate to lights 516A-516C, respectively. Lights 516A-516C can also be connected to network 508 and controllable by server 510. In this example, server 510 can receive the audio signal from microphone 506B closest to users 502, 504.

When remote user device 512 streams the audio signal, server 510 can cause light 516B coupled to active microphone 506B to generate a projection 518 downward into environment 500B. Projection 518 can simulate the position of the remote user as if the remote user were present in environment 500B, and alert in-person users 502, 504 to the remote user's virtual presence in the conversation. Although shown as a down pointing light, it is contemplated that projection 518 can alternatively or additionally be a representation of the remote user, such as the remote user's name, avatar, live image, hologram, etc.

In some implementations, remote user device 512 can select to record the conversation between users 502, 504 for later access. In such implementations, light 516B can still generate projection 518 even though the remote user is not actively listening to the conversation. Thus, projection 518 causes users 502, 504 to be aware that the conversation is being recorded.

Although shown and described in this example as using projection 518, it is contemplated that any form of audio, visual, or mechanical alert can be used to signal that the remote user is streaming the conversation of users 502, 504. For example, as described above, environment 500B can include one or more speakers (not shown). In such an example, a speaker can audibly announce to users 502, 504 that their conversation is being listened to by the remote user or recorded for later listening or transcription. When a speaker is included in environment 500B, remote user device 512 can also transmit audio signals back to the users 502, 504 via network 508, in order to participate in their conversation.

Although shown and described as communicating over network 508, it is contemplated that server 510 can alternatively be collocated with and/or directly coupled to microphones 506A-506E in environment 500B. Further, it is contemplated that network 508 can be a local area network (LAN) or a wide area network (WAN), but can also be other wired or wireless networks, as with network 230 of FIG. 2 described above, and may be the Internet or some other public or private network.

Figure 6:
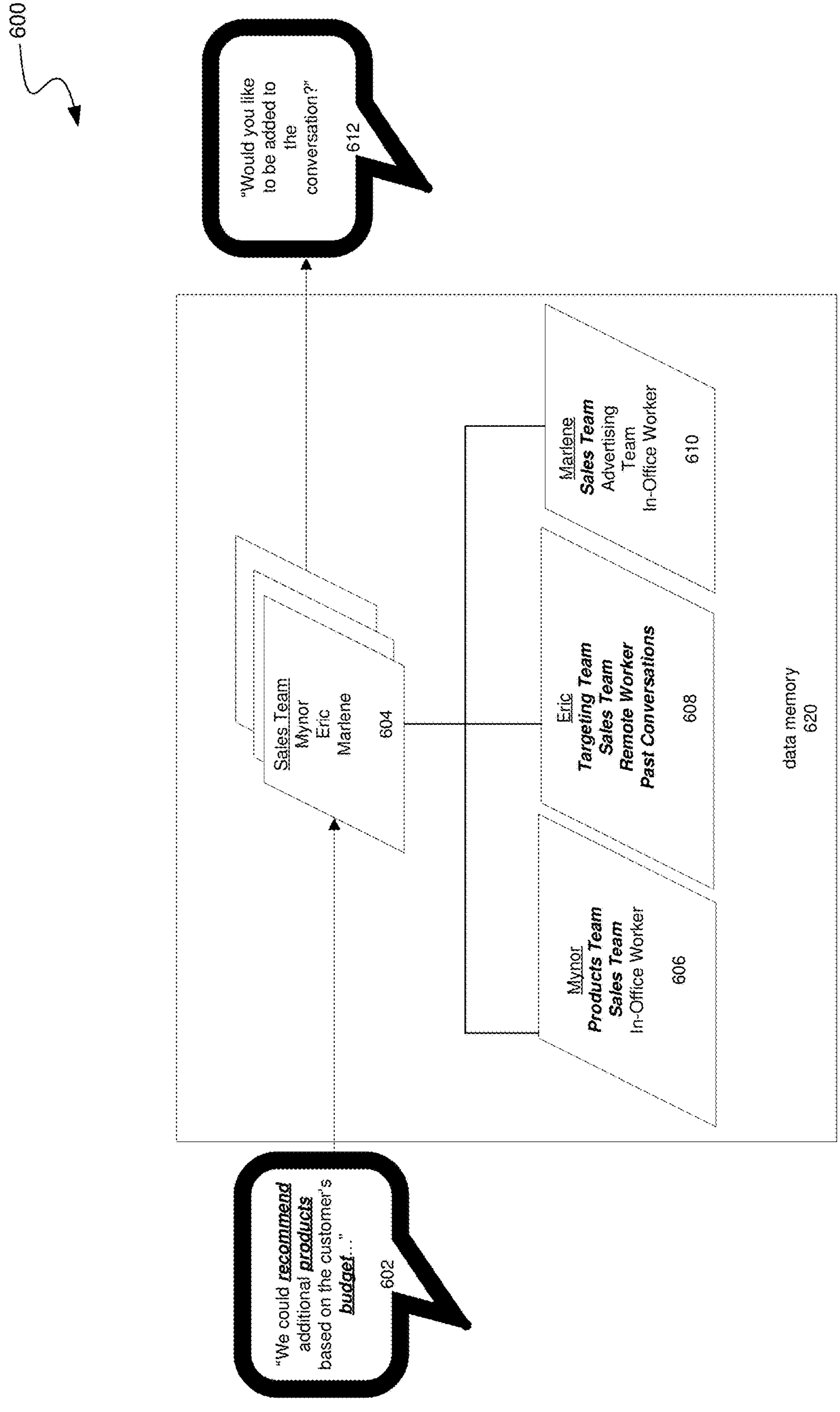
FIG. 6 is a conceptual diagram illustrating an example of a system including data inputs and outputs used to determine whether to recommend access for a remote user to in-person audio.

FIG. 6 is a conceptual diagram illustrating an example of a system 600 including data inputs and outputs used to determine whether to recommend access for a remote user to in-person audio. System 600 can receive transcript 602 as input. Transcript 602 in this example can reflect a conversation stating: "We could recommend additional products based on the customer's budget . . . ". System 600 can apply a model to transcript 602 to determine whether the conversation is relevant to a remote user.

The model applied to transcript 602 can be trained based on a variety of data stored in data memory 620. Data memory 620 can include any data relevant to the transcript 602 of the conversation, including contextual factors associated with the conversation, such as where and when the conversation was held, and who was involved in the conversation. In this example, the model can determine that transcript 602 is relevant to the sales team and access data record 604 including a list of workers on that team (i.e., Mynor, Eric, and Marlene). In another example, and as described further herein with respect to FIG. 4, system 600 can identify Mynor and Marlene as the participants in the conversation, and determine that they overlap on the sales team with Eric, a remote worker.

Data memory 620 can further include data records 606, 608, 610 including data relevant to the members of the sales team (i.e., Mynor, Eric, and Marlene, respectively). The model can access data records 606, 608, 610 to identify metadata associated with Mynor, Eric, and Marlene, respectively, that could be relevant to transcript 602. For example, the model can identify that Eric is a remote worker and that he is a member of the targeting team and the sales team. Data record 608 associated with remote worker Eric can further include information about past in-person conversations that were made available for him to listen to remotely and whether he chose to listen to them, including transcripts of those past conversations.

System 600 can train the model using some or all of data records 604-610 and apply it to transcript 602. In this example, system 600 can apply a model trained with data record 608 to transcript 602 to determine that the in-person conversation associated with transcript 602 is relevant to remote worker Eric. System 600 can output notification 612 to a remote device associated with Eric asking whether he would like to join the conversation associated with transcript 602.

Figure 7:
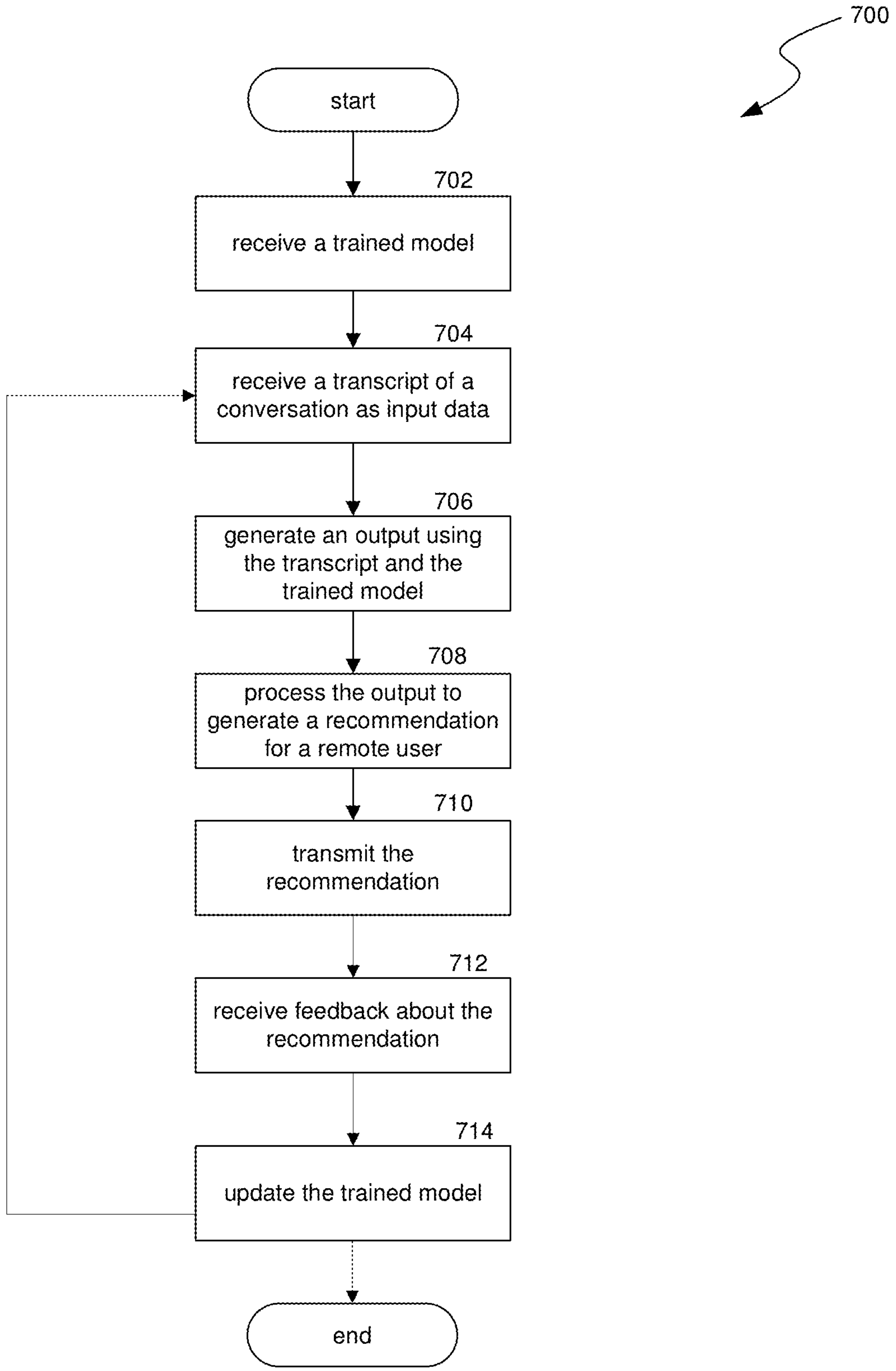
FIG. 7 is a flow diagram illustrating a process used in some implementations for applying and updating a trained model to determine whether to recommend access for a remote user to in-person audio.

FIG. 7 is a flow diagram illustrating a process 700 used in some implementations for applying and updating a trained model to determine whether to recommend access for a remote user to in-person audio. At block 702, process 700 receives a trained model configured to map transcripts of conversations to relevant remote users. For example, process 700 can train the model using metadata associated with a user, natural language data included in transcripts of conversations, data regarding whether a user was prompted to join a particular past conversation, whether the user decided to join that conversation, and/or contextual factors. In some implementations, the training data can be used to generate a semantic space, within which each conversation and data corresponding to a specific user is assigned a candidate vector. Although described herein with respect to a semantic space as one example, it is contemplated that any suitable natural language training approach or model can be implemented.

At block 704, process 700 can receive new input data 810 including a transcript of the conversation, contextual, etc. For example, as described above with respect to FIG. 3, a transcription module can perform speech recognition on an audio signal to generate a textual transcript of a conversation. The transcript of the conversation can include a series of words, phrases, and sentences in natural language. Process 400 can also receive contextual factors surrounding the conversation, such as where a conversation is taking place, the time of the conversation, emotional identifiers for the conversation (e.g., excited, serious, friendly, angry, etc.) tagged by a machine learning process, who the participants in the conversation are, etc. Additional details regarding how the participants in the conversation are identified are described further herein with respect to FIG. 4.

At block 706, process 700 can generate an output using the transcript, the trained model, user metadata, and contextual factors. In some implementations, based on the input data, process 700 can map the input data to the semantic space. For example, the input data can be processed and fed into the trained model to generate an output vector projected into the semantic space alongside the candidate vectors.

At block 708, process 700 can process the output to generate a recommendation for a remote user. In some implementations, process 700 can calculate a distance between an output vector and each of the candidate vectors. For example, process 700 can generate a match score between the output vector and the candidates vectors based on the calculated distances, and the recommendation can be made based on the match score. The match score can be any numerical or textual value or indicator, such as a statistic or percentage. In some implementations, if the match score between the output vector and a candidate vector is above a threshold, process 700 can generate a recommendation that the remote user virtually join the conversation if the conversation is ongoing. If the conversation has been completed, process 700 can generate a recommendation that the remote user download an audio signal or transcript corresponding to the conversation.

At block 710, process 700 can transmit the recommendation. In some implementations, the recommendation can be transmitted to a device associated with the remote user via an interface. In some implementations, the recommendation can be transmitted to a device proximate to in-person users having the conversation, such through a speaker, onto a laptop, onto a mobile device, or through any other communicative means.

At block 712, process 700 can receive feedback about the recommendation. In some implementations, the feedback can be explicit, e.g., the remote user declines or accepts to join the conversation, the in-person users decline or accept an invitation to add the remote user to the conversation, the remote user joins the conversation then provides feedback that the conversation was relevant or not relevant to them, etc. In some implementations, the feedback can be implicit, e.g., the remote user does not respond to an invitation to join the conversation, the in-person users do not respond to an invitation to add the remote user to the conversation, etc. The remote user and/or the in-person users can provide feedback by the same interface or a different interface by which the recommendation was transmitted.

At block 714, process 700 can update the trained model. For example, process 700 can use the feedback data to identify whether the remote user accepted the recommendation, and use that information as a comparison factor to update the model and/or the semantic space. In some implementations, when updating the trained model, process 700 can weigh the current training data more heavily than the initial or past training data, as the later training data can be considered more relevant and/or accurate.

Some implementations of the remote access audio system can include a machine learning component, such as a neural network, that is trained using a variety of data, including past transcripts of past conversations, metadata associated with the remote user, whether the remote user was presented with an option to join a past conversation, or whether the remote user joined a past conversation. Some implementations can feed input data related to a transcript of a conversation and contextual factors (e.g., time of conversation, location of conversations, users participating in the conversation, emotional identifiers, etc.) into the trained machine learning component, and based on the output, can generate a recommendation. Some implementations provide this recommendation to a user, such as by asking the remote user to virtually join the conversation, or by asking the in-person users to virtually add the remote user to the conversation.

Some implementations receive feedback about the recommendation to further enhance the trained model.

A "machine learning model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the trained model can be a neural network with multiple input nodes that receive input data including a transcript of a conversation and contextual factors. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used to generate a recommendation In some implementations, such neural networks, known as deep neural networks, can have multiple layers of intermediate nodes with different configurations, can be a combination of models that receive different parts of the input and/or input from other parts of the deep neural network, or are convolutions or recurrent—partially using output from previous iterations of applying the model as further input to produce results for the current input.

A machine learning model can be trained with supervised learning, where the training data includes transcript of past conversations, user metadata, data regarding whether a user was recommended to join and/or whether a user joined past conversations, and contextual factors as input and a desired output, such as a recommendation to a remote user to join a conversation. A current transcript and current contextual factors can be provided to the model. Output from the model can be compared to the desired output for that conversation and, based on the comparison, the model can be modified, such as by changing weights between nodes of the neural network or parameters of the functions used at each node in the neural network (e.g., applying a loss function). After applying each of the factors in the training data and modifying the model in this manner, the model can be trained to evaluate new input data.

Figure 8:
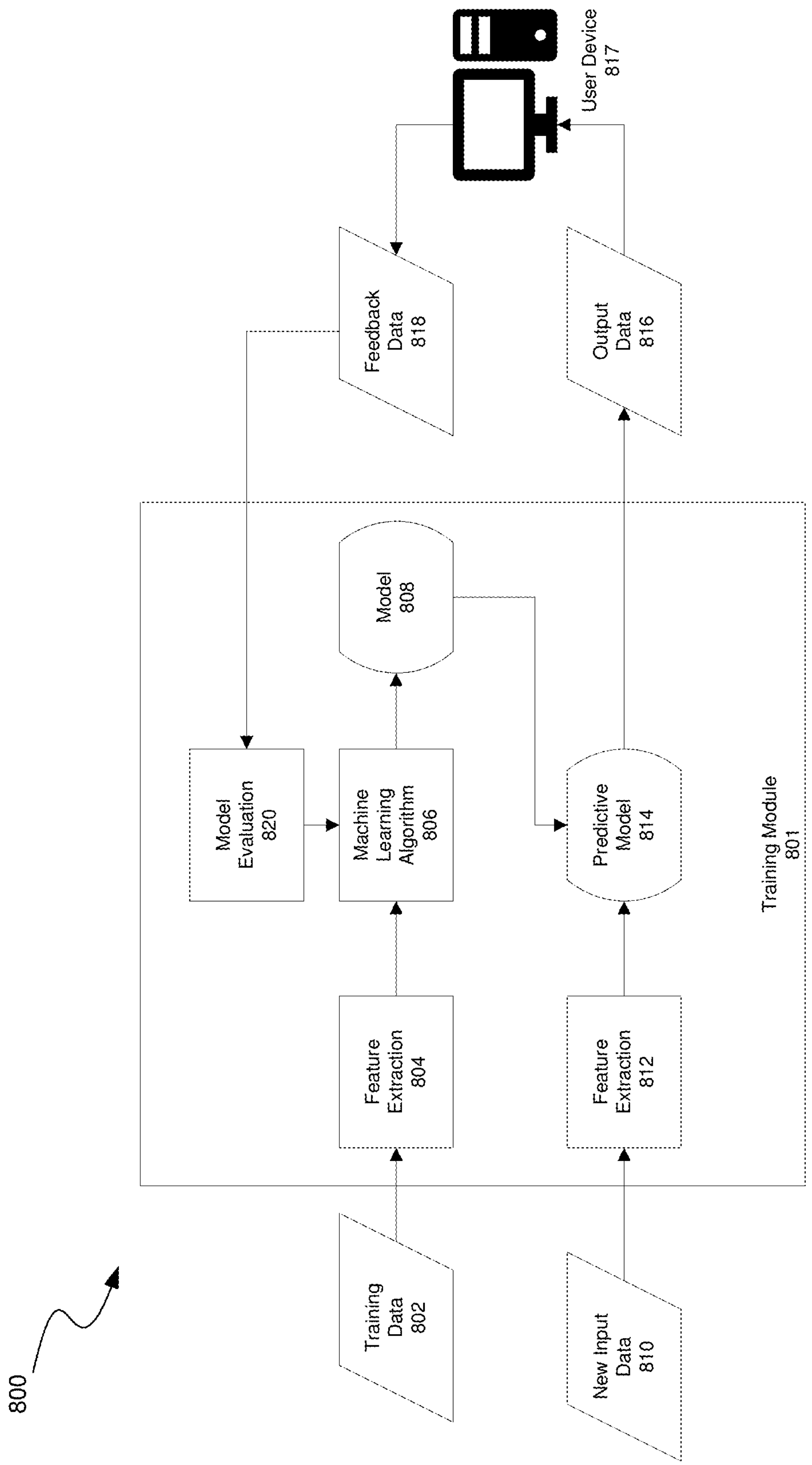
FIG. 8 is a block diagram illustrating an overview of a machine learning system that can be applied to determine whether to recommend access to in-person audio for a remote user in some implementations.

FIG. 8 is a block diagram illustrating an overview of a machine learning system 800 that can be applied to determine whether to recommend access to in-person audio for a remote user in some implementations. In a training phase, system 800 can feed raw training data 802 (e.g., transcripts of past conversations, user metadata, recommendations made, feedback on the recommendations, contextual factors, etc.) into feature extraction 804 of training module 801 to select useful features (e.g., keywords, embeddings, topic tags, user identifiers, etc.) from all available features. As described further herein with respect to FIG. 4, the contextual factors can include where a conversation is taking place, the time of the conversation, emotional identifiers for the conversation (e.g., excited, serious, friendly, angry, etc.) tagged by a machine learning process, who the participants in the conversation are, etc., and can be obtained using any suitable method.

The extracted features are fed to machine learning algorithm 806. Machine learning algorithm 806 can identify a model 808 that maps the transcripts and user metadata to recommendations, and uses past feedback to identify whether the recommendations were correct. In some implementations, model 808 can be a neural network. System 800 can repeat the training phase until a suitable accuracy level is reached, e.g., as identified by applying a loss function, such as when a sufficient amount of training data 802 has been processed and predictions made by model 808 do not deviate too far from actual results.

In a predicting phase, system 800 can feed new input data into feature extraction 812 of training module 801 to select useful features. System 800 can apply a predictive model 814 to the extracted features based on the trained model 808 to generate output data 816 (e.g., a recommendation that a remote user virtually join a conversation). System 800 provides output data 816 to user device 817, such as a remote user's computing device or mobile device. The remote user can provide feedback data 818 to training module 801 via user device 817, such as feedback regarding whether user device 817 accepted the recommendation, explicit feedback indicating that the recommendation was incorrect, etc.

System 800 can input the feedback data 818 into model evaluation 820 to restart the training phase. Model evaluation 820 can evaluate predictive model 814 with metrics, for example. The metrics can include accuracy, precision, F1 score, Mean Squared Error, etc. System 800 can feed these metrics back into machine learning algorithm 806 to refine and update model 808, if necessary, and the predicting phase can be repeated.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing a user with access to in-person audio, the method comprising:

obtaining a representation of the in-person audio being captured at an in-person site;

receiving a trained model, trained using representations of past conversations, metadata associating one or more users with the past conversations, and data indicating whether the one or more users remotely accessed the past conversations;

applying the trained model to the representation of the in-person audio to determine that a conversation, corresponding to the in-person audio, is relevant to the user, wherein the user is located remotely from the in-person site; and facilitating the user receiving a representation of the conversation, corresponding to the in-person audio.

2. The method of claim 1, wherein the representation of the conversation includes a recording of the in-person audio for playback by the user.

3. The method of claim 1 further comprising:

generating, at the in-person site, a projection of a representation of the user when the user is receiving the representation of the conversation.

4. The method of claim 1, wherein the representation of the in-person audio is obtained from a plurality of microphones installed at the in-person site, and wherein the method further comprises:

performing directional analysis on the in-person audio to locate a source of the in-person audio; and transmitting an alert in a vicinity of the source at the in-person site when the user is receiving the representation of the conversation.

5. The method of claim 1, wherein the trained model was further trained using contextual factors associated with the past conversations; and wherein the method further comprises obtaining contextual factors associated with the conversation, wherein applying the trained model uses the contextual factors associated with the conversation.

6. The method of claim 5, wherein the obtaining the contextual factors associated with the conversation includes:

identifying participants in the conversation;

obtaining metadata associated with the identified participants and metadata associated with the user; and identifying an overlap between the metadata associated with the identified participants and the metadata associated with the user, wherein the applying the trained model uses the overlap between the metadata associated with the identified participants and the metadata associated with the user.

7. The method of claim 1 further comprising:

updating the trained model using a transcript of the conversation and data indicating whether the user received the representation of the conversation.

8. A non-transitory computer-readable storage medium storing instructions, for providing a user with access to in-person audio, the instructions, when executed by a computing system, cause the computing system to:

obtain a representation of the in-person audio being captured at an in-person site;

receive a trained model, trained using representations of past conversations, metadata associating one or more users with the past conversations, and data indicating whether the one or more users accessed the past conversations;

apply the trained model to the representation of the in-person audio to determine that a conversation, corresponding to the in-person audio, is relevant to the user, wherein the user is located remotely from the in-person site; and facilitate the user receiving a representation of the conversation, corresponding to the in-person audio.

9. The non-transitory computer-readable storage medium of claim 8, wherein the representation of the conversation includes a recording of the in-person audio for playback by the user.

10. The non-transitory computer-readable storage medium of claim 8, wherein the instructions, when executed by the computing system, further cause the computing system to:

generate, at the in-person site, a projection of a representation of the user when the user is receiving the representation of the conversation.

11. The non-transitory computer-readable storage medium of claim 8, wherein the representation of the in-person audio is obtained from a plurality of microphones installed at the in-person site, and wherein the instructions, when executed by the computing system, further cause the computing system to:

perform directional analysis on the in-person audio to locate a source of the in-person audio; and transmit an alert in a vicinity of the source at the in-person site when the user is receiving the representation of the conversation.

12. The non-transitory computer-readable storage medium of claim 8, wherein the trained model was further trained using contextual factors associated with the past conversations; and wherein the instructions, when executed by the computing system, further cause the computing system to obtain contextual factors associated with the conversation, wherein applying the trained model uses the contextual factors associated with the conversation.

13. The non-transitory computer-readable storage medium of claim 12, wherein the obtaining the contextual factors associated with the conversation includes:

identifying participants in the conversation;

obtaining metadata associated with the identified participants and metadata associated with the user; and identifying an overlap between the metadata associated with the identified participants and the metadata associated with the user, wherein the applying the trained model uses the overlap between the metadata associated with the identified participants and the metadata associated with the user.

14. The non-transitory computer-readable storage medium of claim 8, wherein the instructions, when executed by the computing system, further cause the computing system to:

update the trained model using a transcript of the conversation and data indicating whether the user received the representation of the conversation.

15. A computing system for providing a user with access to in-person audio, the computing system comprising:

one or more processors; and one or more memories storing instructions that, when executed by the one or more processors, cause the computing system to:

obtain a representation of the in-person audio being captured at an in-person site;

receive a trained model, trained using representations of past conversations, metadata associating one or more users with the past conversations, and data indicating whether the one or more users accessed the past conversations;

apply the trained model to the representation of the in-person audio to determine that a conversation, corresponding to the in-person audio, is relevant to the user, wherein the user is located remotely from the in-person site; and facilitate the user receiving a representation of the conversation, corresponding to the in-person audio.

16. The computing system of claim 15, wherein the representation of the conversation includes a recording of the in-person audio for playback by the user.

17. The computing system of claim 15, wherein the instructions, when executed by the computing system, further cause the computing system to:

generate, at the in-person site, a projection of a representation of the user when the user is receiving the representation of the conversation.

18. The computing system of claim 15, wherein the representation of the in-person audio is obtained from a plurality of microphones installed at the in-person site, and wherein the instructions, when executed by the computing system, further cause the computing system to:

perform directional analysis on the in-person audio to locate a source of the in-person audio; and transmit an alert in a vicinity of the source at the in-person site when the user is receiving the representation of the conversation.

19. The computing system of claim 15, wherein the trained model was further trained using contextual factors associated with the past conversations; and wherein the instructions, when executed by the computing system, further cause the computing system to obtain contextual factors associated with the conversation, wherein applying the trained model uses the contextual factors associated with the conversation.

20. The computing system of claim 15, wherein the instructions, when executed by the computing system, further cause the computing system to:

update the trained model using a transcript of the conversation and data indicating whether the user received the representation of the conversation.

* * * * *